US011487820B2

(12) United States Patent
Mostafa et al.

(10) Patent No.: US 11,487,820 B2
(45) Date of Patent: Nov. 1, 2022

(54) DYNAMIC NATURAL QUESTION GENERATION VIA SEMANTIC KNOWLEDGE REPRESENTATION (71) Applicant: International Business Machines Corporation, Armonk, NY (US)

(72) Inventors: Mohammed Mostafa, Kanata (CA); Ali Khanafer, Ottawa (CA); Joyce Miryam Habbouche, Ottawa (CA); Rola Shaar, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 16/835,955

(22) Filed: Mar. 31, 2020

(65) Prior Publication Data
US 2021/0303635 A1   Sep. 30, 2021

(51) Int. Cl.
*G06F 16/332*   (2019.01)
*G06F 16/9032*   (2019.01)
(Continued)

(52) U.S. Cl.
CPC ...... *G06F 16/90332* (2019.01); *G06F 16/367* (2019.01); *G06F 16/9024* (2019.01); *G06F 40/56* (2020.01)

(58) Field of Classification Search
CPC .. G06F 16/3329; G06F 40/30; G06F 16/9024; G06F 16/367; G06F 16/3344;
(Continued)

(56) References Cited

U.S. PATENT DOCUMENTS

| 5,519,608 | A | 5/1996 | Kupiec |
| 5,749,736 | A | 5/1998 | Griswold et al. |
| 9,535,898 | B2 | 1/2017 | Baughman et al. |
| 9,754,504 | B2 | 9/2017 | Allen et al. |
| 9,940,584 | B2* | 4/2018 | Bagchi ............... G06N 5/04 |
| 10,438,119 | B2* | 10/2019 | Buchanan ........... G06N 5/02 |
| 10,606,893 | B2* | 3/2020 | Brennan ............ G06F 16/9024 |

(Continued)

FOREIGN PATENT DOCUMENTS

KR   101847345 B1   4/2018

OTHER PUBLICATIONS

Kumar et al, "Difficulty-controllable multi-hop question generation from knowledge graphs", Oct. 2019, InInternational Semantic Web Conference Oct. 26, 2019 (pp. 382-398). Springer, Cham.*

(Continued)

Primary Examiner — Olujimi A Adesanya
(74) Attorney, Agent, or Firm — Yee & Associates, P.C.

(57) ABSTRACT

Guided exploration of data is provided. A semantic graph corresponding to a dataset is generated using identified relations among columns of the dataset that are identified based on mapping the columns to main concepts in a generic ontology. A subgraph of the semantic graph is formed based on identification of nodes corresponding to relevant central concepts within the semantic graph using graph centrality metrics. A plurality of paths is identified in the subgraph using a bi-directional multiple hop search from the nodes corresponding to the relevant central concepts in the subgraph. A relevance score is assigned to each path in the plurality of paths using a graph-theoretic metric and the graph centrality metrics. A set of natural language questions based on relevant central concepts and concept relations corresponding to nodes in each respective path with an assigned relevance score greater than a minimum threshold score is output to the user.

20 Claims, 5 Drawing Sheets

(51) Int. Cl.
*G06F 16/901* (2019.01)
*G06F 16/36* (2019.01)
*G06F 40/56* (2020.01)

(58) Field of Classification Search
CPC .. G06F 16/90332; G06F 16/243; G06F 16/36; G06F 40/56; G06F 16/242; G06F 16/9032
See application file for complete search history.

(56) References Cited

U.S. PATENT DOCUMENTS

| | | | |
|---|---|---|---|
| 2005/0256818 A1* | 11/2005 | Sun | G06Q 10/06316 705/301 |
| 2011/0125734 A1 | 5/2011 | Duboue et al. | |
| 2011/0320187 A1 | 12/2011 | Motik et al. | |
| 2012/0078837 A1 | 3/2012 | Bagchi et al. | |
| 2016/0373456 A1* | 12/2016 | Vermeulen | G06F 16/3322 |
| 2017/0061324 A1* | 3/2017 | Glass | G06N 7/005 |
| 2017/0124158 A1* | 5/2017 | Mirhaji | G06F 40/284 |
| 2017/0161254 A1* | 6/2017 | Gallé | G06F 40/56 |
| 2017/0177715 A1 | 6/2017 | Chang et al. | |
| 2018/0039696 A1* | 2/2018 | Zhai | G06F 16/35 |
| 2018/0075359 A1* | 3/2018 | Brennan | G06N 5/022 |
| 2018/0246952 A1* | 8/2018 | Ye | G06F 40/205 |
| 2020/0134757 A1* | 4/2020 | Raphael | G06F 16/9024 |
| 2020/0242444 A1* | 7/2020 | Zhang | G06N 3/006 |
| 2022/0027707 A1* | 1/2022 | Wu | G06F 16/9024 |

OTHER PUBLICATIONS

Ghosh, "Methods for Multi-hop Question Generation", May 2019, (Doctoral dissertation, Indian Institute of Technology, MADRAS), pp. 1-41.*

Xu et al, "Exploiting rich syntactic information for semantic parsing with graph-to-sequence model", 2018, arXiv preprint arXiv:1808.07624. Aug. 23, 2018.*

Xu et al, "Sql-to-text generation with graph-to-sequence model", 2018,. arXiv preprint arXiv:1809.05255. Sep. 14, 2018, pp. 1-6.*

De Cao et al. "Question answering by reasoning across documents with graph convolutional networks", Aug. 2018, arXiv preprint arXiv:1808.09920. Aug. 29, 2018, pp. 1-12.*

Chen et al, "Toward subgraph guided knowledge graph question generation with graph neural networks", Apr. 2020, arXiv preprint arXiv:2004.06015. Apr. 13, 2020, pp. 1-12.*

Sun et al, "Knowledge based machine reading comprehension", Sep. 2018, . arXiv preprint arXiv:1809.04267. Sep. 12, 2018, pp. 1-9.*

Seyler et al., "Question Generation from Knowledge Graphs," Master's Thesis in Computer Science, Saarland University, Max Planck Institute for Informatics, Saarbrücken, Germany, Oct. 2015, 118 pages. https://pdfs.semanticscholar.org/e598/bfbc978da381492a5cbf28ceae4fa610f035.pdf.

Yao et al., "Semantics-based Question Generation and Implementation," Dialogue and Discourse, vol. 3, No. 2, Mar. 12, 2012, pp. 11-42. http://cs.jhu.edu/~xuchen/paper/Yao2012DDqg.pdf.

Dali et al., "Question Answering Based on Semantic Graphs," 18th International World Wide Web Conference (WWW2009,) Apr. 2009, Madrid, Spain, 7 pages. http://citeseerx.ist.psu.edu/viewdoc/download?doi=10.1.1.204.5721&rep=rep1&type=pdf.

Rais-Ghasem et al., "Toward Semantic Data Analysis," 2013 Conference of the Center for Advanced Studies on Collaborative Research, Nov. 2013 pp. 192-199. https://dl.acm.org/doi/10.5555/2555523.2555544.

* cited by examiner

DYNAMIC NATURAL QUESTION GENERATION VIA SEMANTIC KNOWLEDGE REPRESENTATION

BACKGROUND

1. Field

The disclosure relates generally to data analytics and more specifically to dynamically generating relevant questions in natural language via semantic knowledge representation of a generic ontology of an organization to guide a user in starting a data analytics process.

2. Description of the Related Art

Data analytics is the science of analyzing a mass of raw data in order to make conclusions about that information. Data analytics may utilize a plurality of different processes, such as, for example, inspecting, cleansing, transforming, and modeling, to analyze the mass of raw data. In addition, data analytics may be utilized in a plurality of data domains, such as, for example, a business domain, a healthcare domain, a financial domain, a banking domain, an entertainment domain, an education domain, an insurance domain, and the like. Data analytics can reveal trends and metrics that would otherwise be hidden within the mass of raw data. This revealed information can then be used to optimize processes to increase overall efficiency of an organization, such as, for example, a business, company, enterprise, institution, agency, or the like.

SUMMARY

According to one illustrative embodiment, a computer-implemented method for guided exploration of data is provided. A computer generates a semantic graph corresponding to a dataset selected by a user using identified relations among columns of the dataset that are identified based on mapping the columns to main concepts in a generic ontology. The computer forms a subgraph of the semantic graph based on identification of nodes corresponding to relevant central concepts within the semantic graph using graph centrality metrics. The computer identifies a plurality of paths in the subgraph using a bi-directional multiple hop search from the nodes corresponding to the relevant central concepts in the subgraph. The computer, using a graph-theoretic metric and the graph centrality metrics, assigns a relevance score to each path in the plurality of paths. The computer outputs a set of natural language questions based on relevant central concepts and concept relations corresponding to nodes in each respective path with an assigned relevance score greater than a minimum threshold score to the user to guide the user in a data analytics process. According to other illustrative embodiments, a computer system and computer program product for guided exploration of data are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
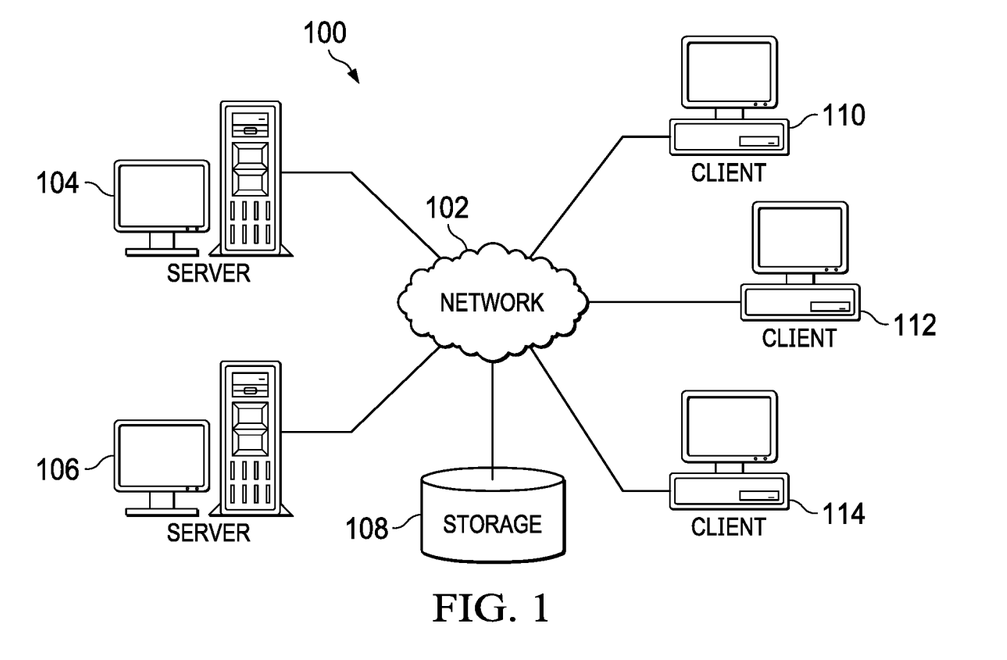
FIG. 1 is a pictorial representation of a network of data processing systems in which illustrative embodiments may be implemented.
Figure 2:
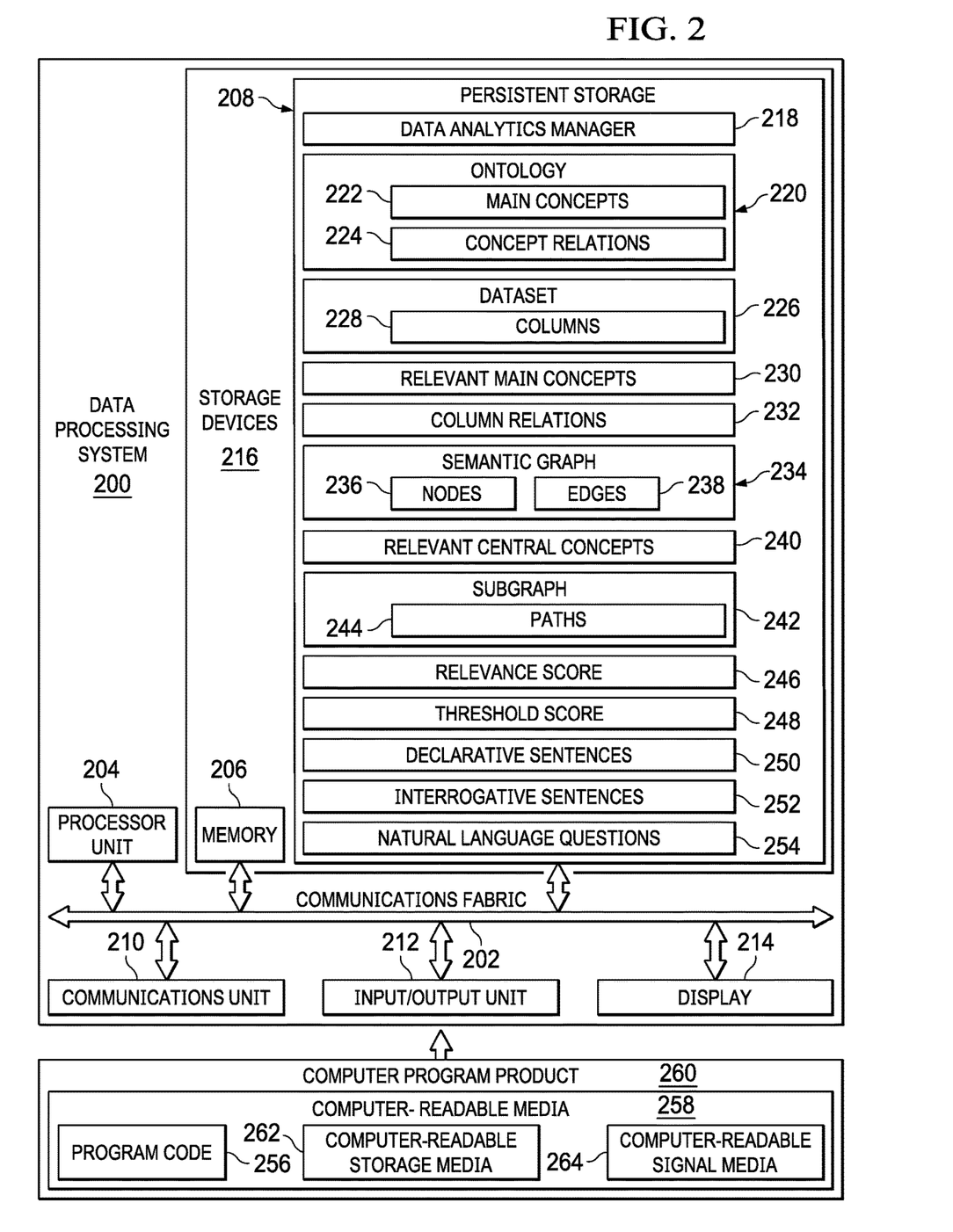
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent clusters of servers in one or more data centers. Alternatively, server 104 and server 106 may each represent multiple computing nodes in one or more cloud environments.

In addition, server 104 and server 106 may provide data analytics management services of illustrative embodiments to client devices by dynamically generating relevant questions in natural language to guide a user in starting a data analytics process. Illustrative embodiments generate a semantic graph representation of a dataset selected by the user from an ontology corresponding to an organization. The semantic graph is a directed graph that includes nodes (vertices) representing concepts and edges connecting the nodes, which represent relationships between the concepts. A concept may be, for example, an idea, topic, theme, subject, product, issue, item, and the like. Illustrative embodiments utilize a large generic ontology comprising main concepts and concept relations relevant to business analytics of the organization. Given the particular dataset selected by the user, from all of the main concepts and concept relations that exist in the generic ontology, illustrative embodiments first identify those main concepts and concept relations that are relevant to that particular dataset. Illustrative embodiments then map columns corresponding to that particular dataset selected by the user to find the main concepts and relations that are relevant to the selected dataset from the larger ontology via a concept identification process. After illustrative embodiments map the columns to the main concepts in the ontology, illustrative embodiments then identify and build relations among the columns corresponding to the concepts. It should be noted that illustrative embodiments can identify relations among columns even when the columns belong to different tables.

Given the semantic graph that illustrative embodiments generated from the user-selected dataset, illustrative embodiments identify the relevant concepts and concept relations that will assist in generating relevant questions in natural language. For example, if the semantic graph contains the following concept relations:

Manager <manages> Employee
Employee <has> Salary, then illustrative embodiments may generate a relevant natural language question from those concept relations, such as, for example, "Which manager manages the employees with the highest salary?" In this illustrative example, the concepts are "Manager", "Employee", and "Salary" and the concept relations are: "manages" and "has".

Illustrative embodiments restrict the search of the semantic graph to concepts that are the focus of business analytics of the organization, which can be configurable based on predefined criteria. In other words, configurable means that the user can define the set of concepts that are the focus of the business analytics. Then, illustrative embodiments perform the restricted search over the semantic graph to find the concepts that are central to the semantic graph using, for example, graph centrality metrics. Centrality identifies the most significant nodes within the semantic graph. Degree centrality is defined as the number of edges (i.e., both indegree and outdegree) incident upon a given node within the semantic graph.

Then, illustrative embodiments form a subgraph of the semantic graph based on the identified central concept nodes and their concept relations. Afterward, illustrative embodiments perform a bi-directional 1-hop and 2-hop search from those nodes, which correspond to the central concepts, in order to identify various paths in the subgraph. For example, the concept relations in the illustrative example above can result in the following 2-hop path starting at the concept "Manager":

Manger-manages→ Employee-has→ Salary.

It should be noted that illustrative embodiments can utilize a recommender system to identify the subset of columns that may be of interest for the given dataset.

Using a graph-theoretic metric (e.g., path length) and graph centrality metrics (e.g., degree centrality of concepts included in a particular path), illustrative embodiments assign a relevance score to each identified path corresponding to the central concepts in the subgraph. Illustrative embodiments assign a higher relevance score to an identified path of relatively longer length that includes central concept nodes with relatively higher centrality scores. Conversely, illustrative embodiments assign a lower relevance score to an identified path of relatively shorter length that includes central concept nodes with relatively lower centrality scores. It should be noted that illustrative embodiments may utilize a weighted average of the path length and cumulative degree centrality of nodes included in a particular path to calculate the relevance score of that particular path in the subgraph.

Having identified the most relevant paths in the subgraph, illustrative embodiments generate questions, in natural language, based on the central concepts corresponding to the nodes included in the identified paths. Illustrative embodiments first generate a set of declarative sentences based on the identified subgraph of central concept nodes and concept relation paths. Illustrative embodiments then convert the set of declarative sentences into interrogative sentences of appropriate types, such as who, what, when, where, and why, to form a set of natural language questions. Afterward, illustrative embodiments output the set of natural language questions to a client device corresponding the user to guide the user in the business analytics process.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to access and utilize the data analytics management services provided by server 104 and server 106. A user may be, for example, a data scientist, data analyst, subject matter expert, organization executive, or the like.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different users, a set of one or more ontologies of main concepts and concept relations, and the like. Furthermore, storage 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing the data analytics management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores data analytics manager 218. However, it should be noted that even though data analytics manager 218 is illustrated as residing in persistent storage 208, in an alternative illustrative embodiment data analytics manager 218 may be a separate component of data processing system 200. For example, data analytics manager 218 may be a hardware component coupled to communication fabric 202 or a combination of hardware and software components. In another alternative illustrative embodiment, a first set of components of data analytics manager 218 may be located in data processing system 200 and a second set of components of data analytics manager 218 may be located in a second data processing system, such as, for example, server 106 in FIG. 1.

Data analytics manager 218 controls the process of dynamically generating relevant questions in natural language via semantic knowledge representation of ontology 220 to guide a user in starting a data analytics process. Ontology 220 is a large generic ontology that contains metadata comprised of main concepts 222 and concept relations 224 that correspond to data analytics of interest to an organization. The organization maintains ontology 220. Main concepts 222 represent ideas, topics, and other areas of focus corresponding to the organization and concept relations 224 represent links or connections between different concepts within main concepts 222.

Dataset 226 represents raw data selected by the user for analysis by data analytics manager 218 to discover latent concept relations within dataset 226. Dataset 226 is comprised of columns 228. Columns 228 may contain any type of data attribute.

Data analytics manager 218 identifies relevant main concepts 230 within main concepts 222 that are relevant to dataset 226. Then, data analytics manager 218 maps columns 228 of dataset 226 to relevant main concepts 230. Further, data analytics manager 218 identifies column relations 232 among columns 228 based on the mapping between columns 228 and relevant main concepts 230.

Data analytics manager 218 generates semantic graph 234 corresponding to dataset 226 using relevant main concepts 230 and column relations 232. Semantic graph 234 is comprised of nodes 236 and edges 238. Each node in nodes 236 represents a particular concept in relevant main concepts 230. Each edge in edges 238 represents a particular relation between two relevant main concepts based on column relations 232.

Data analytics manager 218 utilizes a restricted search of semantic graph 234 to identify nodes corresponding to relevant central concepts 240 using graph centrality metrics (i.e., degree centrality of each particular node). Relevant central concepts 240 represent those concepts that are more significant or pertinent to dataset 226 (i.e., concepts corresponding to nodes having higher centrality scores).

Data analytics manager 218 forms subgraph 242 from semantic graph 234 based on identification of relevant central concepts 240. Furthermore, data analytics manager 218 identifies paths 244 among relevant central concepts 240 within subgraph 242 using, for example, a bi-directional multi-hop search. Paths 244 follow concept relation edges between each of relevant central concepts 240 within subgraph 242.

Data analytics manager 218 assigns relevance score 246 to each path in paths 244 of subgraph 242. Data analytics manager 218 may calculate relevance score 246 for each respective path based on, for example, a weighted average of path length and degree centrality of each node included in that particular path. Then, data analytics manager 218 compares relevance score 246 of each respective path in paths 244 to threshold score 248. Threshold score 248 is a minimum relevance score threshold level.

Data analytics manager 218 selects those paths in paths 244 that have a relevance score greater than threshold score 248. Afterward, data analytics manager 218 generates declarative sentences 250 using the relevant central concepts and concept relations corresponding to nodes included in those paths in paths 244 that have a relevance score greater than threshold score 248.

Data analytics manager 218 then converts declarative sentences 250 into interrogative sentences 252 of appropriate types (e.g., who, what, when, where, and why) to form natural language questions 254. Natural language questions 254 represent a set of questions in natural language. Data analytics manager 218 outputs natural language questions 254 to a client device, such as client 110 in FIG. 1, which corresponds to the user, to guide the user in the data analytics process.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 256 is located in a functional form on computer readable media 258 that is selectively removable and may be loaded onto or transferred to data processing system 200 for running by processor unit 204. Program code 256 and computer readable media 258 form computer program product 260. In one example, computer readable media 258 may be computer readable storage media 262 or computer readable signal media 264.

In these illustrative examples, computer readable storage media 262 is a physical or tangible storage device used to store program code 256 rather than a medium that propagates or transmits program code 256. Computer readable storage media 262 may include, for example, an optical or magnetic disc that is inserted or placed into a drive or other device that is part of persistent storage 208 for transfer onto a storage device, such as a hard drive, that is part of persistent storage 208. Computer readable storage media 262 also may take the form of a persistent storage, such as a hard drive, a thumb drive, or a flash memory that is connected to data processing system 200.

Alternatively, program code 256 may be transferred to data processing system 200 using computer readable signal media 264. Computer readable signal media 264 may be, for example, a propagated data signal containing program code 256. For example, computer readable signal media 264 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 258" can be singular or plural. For example, program code 256 can be located in computer readable media 258 in the form of a single storage device or system. In another example, program code 256 can be located in computer readable media 258 that is distributed in multiple data processing systems. In other words, some instructions in program code 256 can be located in one data processing system while other instructions in program code 256 can be located in one or more other data processing systems. For example, a portion of program code 256 can be located in computer readable media 258 in a server computer while another portion of program code 256 can be located in computer readable media 258 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 256.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Extracting insights from large amounts of data is often a challenging task. Data analysts and data scientists spend extensive amounts of time exploring data in order to discover meaningful relationships among the data. In particular, determining the starting point of a data analytics process is a time-consuming task that requires a repeated process in which different hypothesis are tested. For example, in the consumer data analytics domain, data analysts studying sales data can conduct various analyses, such as exploring performance of different products, satisfaction of different consumers, and impact of shipping cost on purchasing decisions.

To guide the data analytics process, illustrative embodiments present a user (e.g., data analyst, data scientist, subject matter expert, organization executive, or the like) with a set of relevant natural language questions, which can be answered using a dataset selected by the user. Illustrative embodiments first derive a semantic graph of the user's dataset. The semantic graph represents semantic relationships between concepts. The semantic graph includes nodes, which represent concepts, and edges between nodes, which represent semantic relations between concepts. Illustrative embodiments make the user aware of data insights into the user-selected dataset by generating natural language questions based on relevant central concepts located in a subgraph of the semantic graph.

Illustrative embodiments present the user with the relevant questions, in natural language, to guide the user in the data analytics process. Illustrative embodiments generate the semantic graph of the user's dataset utilizing an ontology, which is comprised of a large collection of main concepts and concept relations corresponding to an organization, such as, for example, a business, company, enterprise, institution, agency, or the like. It should be noted that illustrative embodiments are capable of utilizing relational tables of data and not just limited to a corpus of documents.

Given the generated semantic graph of the user's dataset, illustrative embodiments identify the most relevant subgraph of the semantic graph. Illustrative embodiments utilize the semantic subgraph to generate the natural language questions. Further, illustrative embodiments rank the natural language questions based on relevance scores (e.g., 0 to 100), which correspond to identified paths within the semantic subgraph that are used to generate the questions. Illustrative embodiments dynamically update the questions when a user modifies the semantic subgraph of the user's dataset (i.e., when the user modifies concepts and concept relations within the subgraph).

A user may utilize illustrative embodiments to discover, for example, business insights. No current solution has an ability to generate questions, in natural language, that are specific to the user's own dataset. By presenting the user with relevant natural language questions, illustrative embodiments enable the user to fast track the data analytics process and data insight discovery, allowing the user to understand latent concept relations within the user's own dataset.

Thus, illustrative embodiments provide one or more technical solutions that overcome a technical problem with determining where to start a data analytics process to discover latent concept relations within a user-selected set of data. As a result, these one or more technical solutions provide a technical effect and practical application in the field of data analytics.

Figure 3:
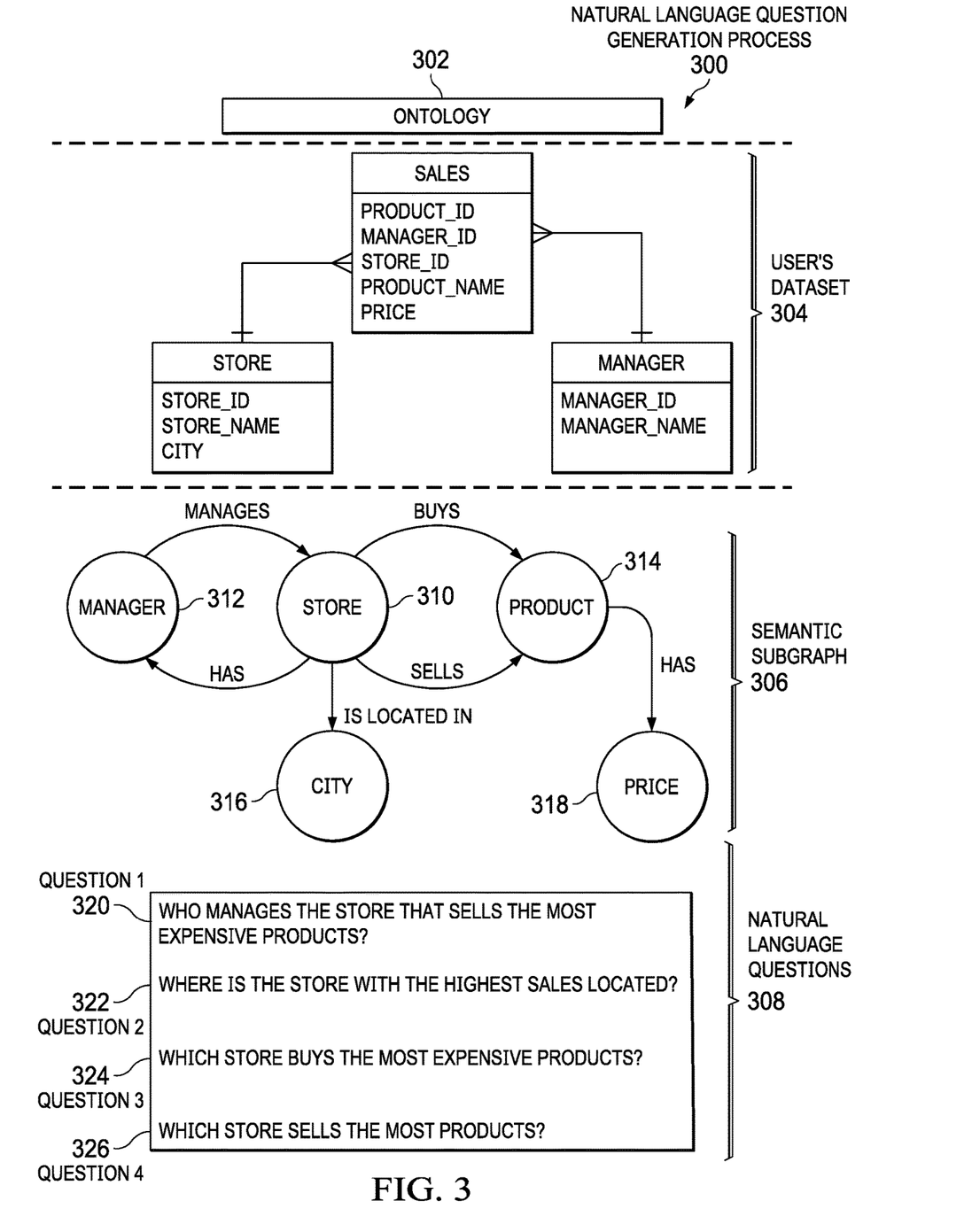
FIG. 3 is a diagram illustrating an example of a natural language question generation process in accordance with an illustrative embodiment.

With reference now to FIG. 3, a diagram illustrating an example of a natural language question generation process is depicted in accordance with an illustrative embodiment. Natural language question generation process 300 may be implemented in a computer, such as server 104 in FIG. 1 or data processing system 200 in FIG. 2.

In this example, natural language question generation process 300 includes ontology 302, user's dataset 304, semantic subgraph 306, and natural language questions 308. However, it should be noted that natural language question generation process 300 is intended as an example only and not as a limitation on illustrative embodiments.

Ontology 302 represents a large generic ontology comprising a plurality of main concepts and concept relations corresponding to a particular organization. Ontology 302 may be, for example, ontology 220 containing main concepts 222 and concept relations 224 in FIG. 2. User's dataset 304 may be, for example, dataset 226 in FIG. 2. User's dataset 304 represents a selected portion of the main concepts and concept relations of ontology 302 by a user, such as, for example, a data analyst, corresponding to the organization. User's dataset 304 includes a set of tables and how they are related. In this example, user's dataset includes tables for sales, store, and manager. The sales table includes columns product identifier, manager identifier, store identifier, product name, and price. The store table includes columns store identifier, store name, and city. The manager table includes columns manager identifier and manager name. It should be noted that illustrative embodiments can relate columns from the different tables.

Semantic subgraph 306 corresponds to user's dataset 304. Semantic subgraph 306 represents the relevant central concepts of user's dataset 304. It should be noted that illustrative embodiments derive edges between the relevant central concept nodes based on ontology 302 only, which presents no context.

In this example, semantic subgraph 306 includes relevant central concept node "STORE" 310, relevant central concept node "MANAGER" 312, relevant central concept node "PRODUCT" 314, relevant central concept node "CITY" 316, and relevant central concept node "PRICE" 318. Relevant central concept node STORE 310 has concept relations of "HAS" and "MANAGES" with relevant central concept node MANAGER 312. In addition, relevant central concept node STORE 310 has concept relations of "BUYS" and "SELLS" with relevant central concept node PRODUCT 314. Further, relevant central concept node STORE 310 has a concept relation of "IS LOCATED IN" with relevant central concept node CITY 316. Furthermore, relevant central concept node PRODUCT 314 has a concept relation of "HAS" with relevant central concept node PRICE 318.

In this example, relevant central concept node STORE 310 has the highest degree centrality in semantic subgraph 306. The degree centrality of a concept node is the sum of input and output edges at that particular node. For example, relevant central concept node STORE 310 has a degree centrality of 5 (i.e., 1 indegree and 4 outdegrees). Relevant central concept node MANAGER 312 has a degree centrality of 2 (i.e., 1 indegree and 1 outdegree). Relevant central concept node PRODUCT 314 has a degree centrality of 3 (i.e., 2 indegrees and 1 outdegree). Relevant central concept node CITY 316 has a degree centrality of 1 (i.e., 1 indegree). Relevant central concept node PRICE 318 has a degree centrality of 1 (i.e., 1 indegree).

Illustrative embodiments compute relevance scores for paths in semantic subgraph 306 based on properties of a path (i.e., length of the path) and degree centrality of the relevant central concept nodes included in that path. Illustrative embodiments then generate natural language questions 308 using the relevant central concepts and concept relations corresponding to a set of paths in semantic subgraph 306 having relevance scores above a predefined threshold score, such as, for example, threshold score 248 in FIG. 2.

In this example, illustrative embodiments generate a set of four natural language questions (i.e., question 1 320, question 2 322, question 3 324, and question 4 326) and rank the set of questions based on the relevance score of the path used to generate a particular question. For example, question 1 320 is "Who manages the store that sells the most expensive products?". This question involves the relevant central concept nodes: MANAGER 312, STORE 310, PRODUCT 314, and PRICE 318. Therefore, the length of the path used to generate this question is 4. Further, the cumulative degree centrality over this path is: deg(MANAGER)+deg(STORE)+deg(PRODUCT)+deg(PRICE)=2+5+3+1=11, where deg(_) is the degree centrality operator.

Question 2 322 is "Where is the store with the highest sales located?". This question involves the relevant central concept nodes: STORE 310, CITY 316, PRODUCT 314, and PRICE 318. The length of this path is also 4. However, the cumulative degree centrality over this path is only 10 (i.e., deg(STORE)+deg(CITY)+deg(PRODUCT)+deg(PRICE)=5+1+3+1=10), which is lower than the cumulative degree centrality of 11 for question 1 320 above.

Question 3 324 is "Which store buys the most expensive products?". This question involves the relevant central concept nodes: STORE 310, PRODUCT 314, and PRICE 318. Therefore, the length of this path is 3. The cumulative degree centrality over this path is: deg(STORE)+deg(PRODUCT)+deg(PRICE)=5+3+1=9, which is lower than question 1 320 and question 2 322 above.

Question 4 326 is "Which store sells the most products?". This question involves the relevant central concept nodes: STORE 310 and PRODUCT 314. Therefore, the length of this path is 2. The cumulative degree centrality over this path is: deg(STORE)+deg(PRODUCT)=5+3=8, which is lower than question 1 320, question 2 322, and question 3 324 above. In other words, questions 320-326 are ranked in descending order with the highest-ranking question listed first and the lowest-ranking question listed last.

It should be noted that illustrative embodiments may calculate the relevance scores of the paths, which are used to generate natural language questions 308, using a weighted average of the path length and cumulative degree centrality values. Further, illustrative embodiments can augment the relevance score computation using rules. For example, illustrative embodiments can assign higher weights for "why" questions when illustrative embodiments determine that why questions are of greater significance to the user. Also, for questions that involve a monetary concept, such as, for example, Price, illustrative embodiments can assign a higher weight to generate a higher relevance score. Factors that illustrative embodiments can consider to influence the relevancy ranking of questions may include, for example, correlation between concepts/columns computed via bivariate analysis, persona (e.g., subject matter expert versus organization executive) of the user that selected the dataset, significance of central concept nodes as computed by a recommender system, and the like. Furthermore, it should be noted that if a user modifies semantic subgraph 306 (e.g., by adding or deleting central concepts or concept relations), then illustrative embodiments automatically update the list of relevant questions to reflect the changes made by the user to semantic subgraph 306.

Figure 4A:
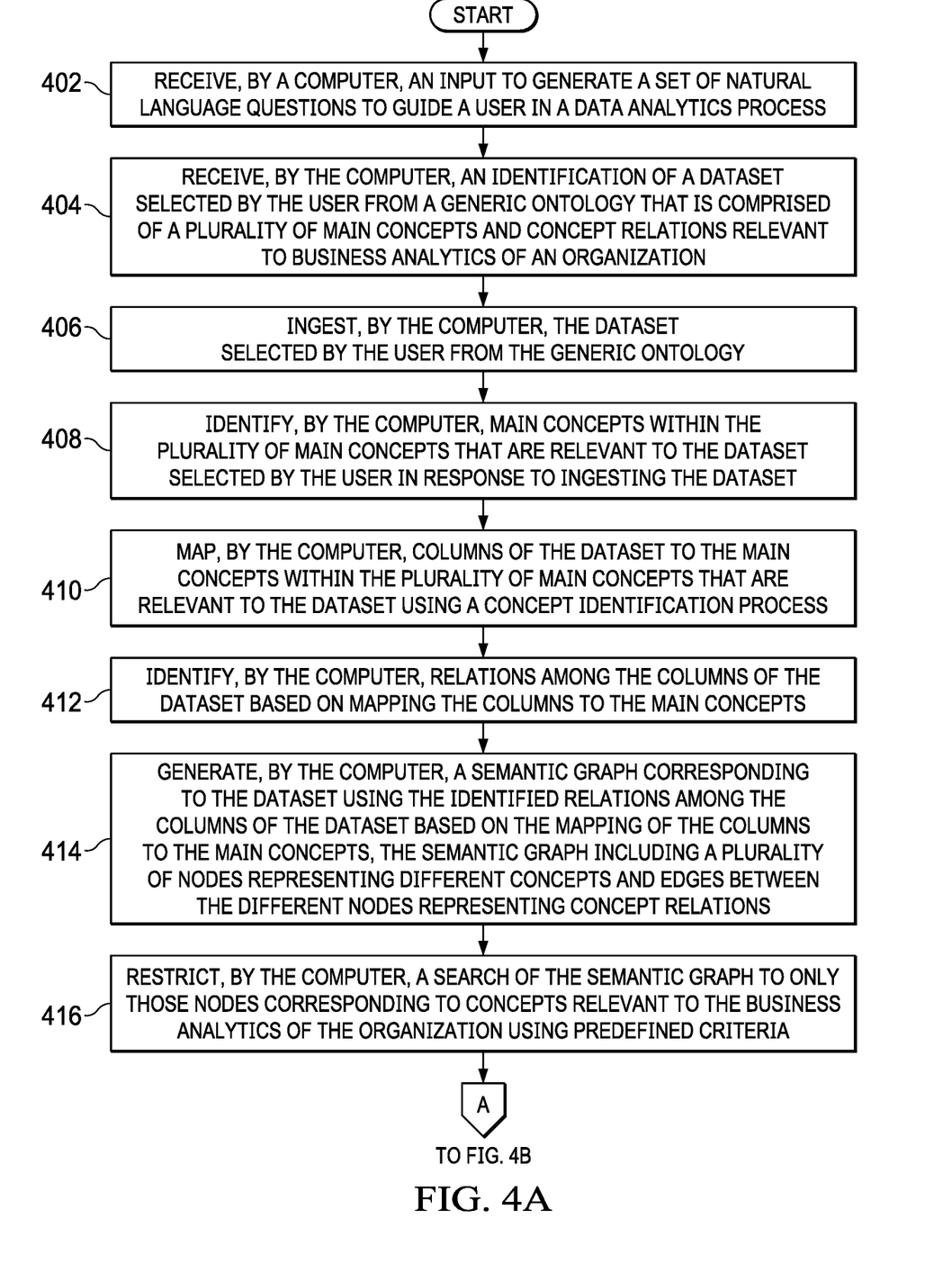
FIGS. 4A-4B are a flowchart illustrating a process for guided exploration of data in accordance with an illustrative embodiment.
Figure 4B:
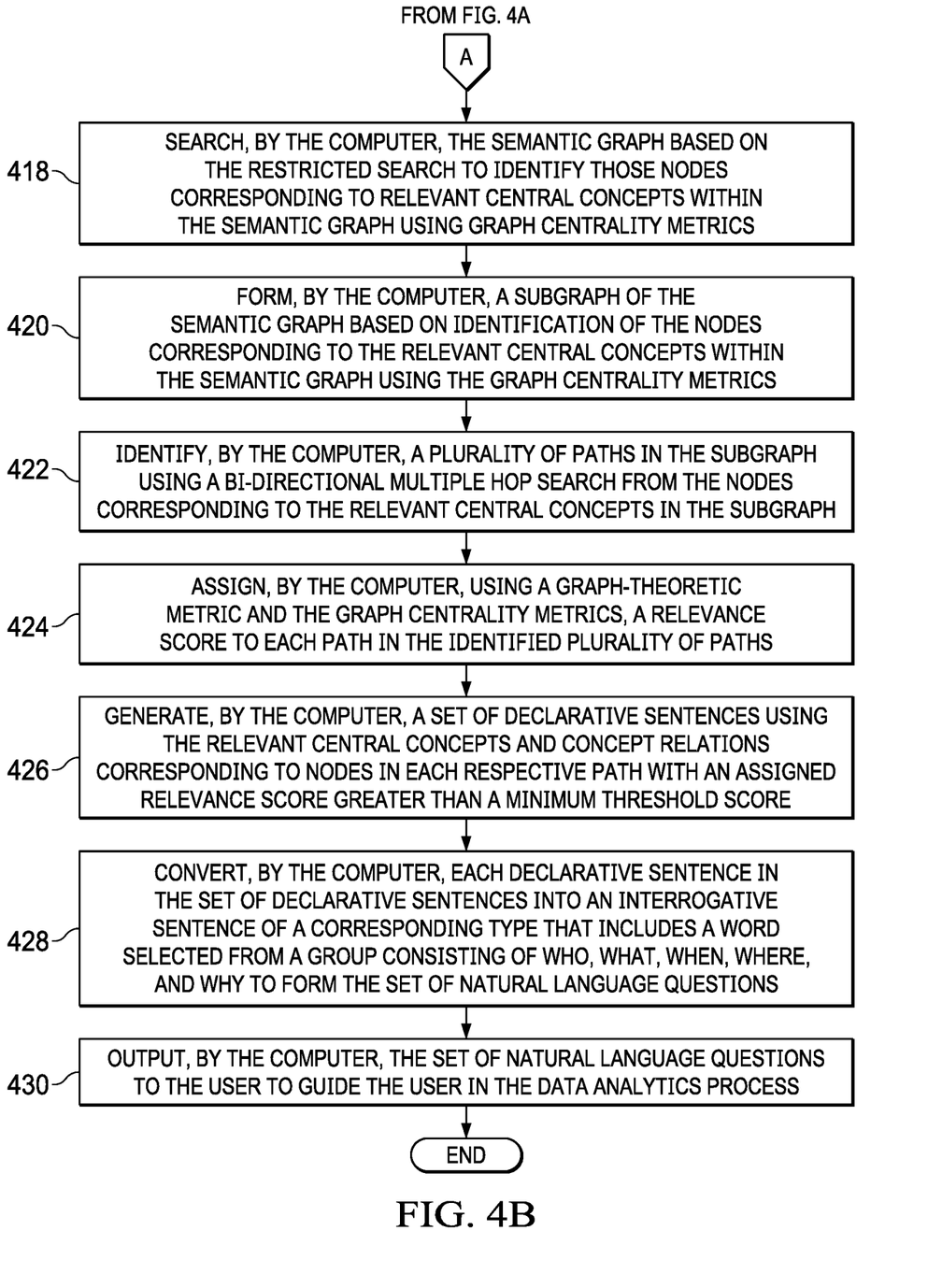

With reference now to FIGS. 4A-4B, a flowchart illustrating a process for guided exploration of data is shown in accordance with an illustrative embodiment. The process shown in FIGS. 4A-4B may be implemented in a computer, such as, for example, server 104 in FIG. 1 or data processing system 200 in FIG. 2.

The process begins when the computer receives an input to generate a set of natural language questions to guide a user in a data analytics process (step 402). In addition, the computer receives an identification of a dataset selected by the user from a generic ontology that is comprised of a plurality of main concepts and concept relations relevant to business analytics of an organization (step 404).

The computer ingests the dataset selected by the user from the generic ontology (step 406). The computer identifies main concepts within the plurality of main concepts that are relevant to the dataset selected by the user in response to ingesting the dataset (step 408). The computer maps columns of the dataset to the main concepts within the plurality of main concepts that are relevant to the dataset using a concept identification process (step 410).

The computer identifies relations among the columns of the dataset based on mapping the columns to the main concepts (step 412). The computer generates a semantic graph corresponding to the dataset using the identified relations among the columns of the dataset that are identified based on the mapping of the columns to the main concepts (step 414). The semantic graph includes a plurality of nodes representing different concepts and edges between the different nodes representing concept relations.

The computer restricts a search of the semantic graph to only those nodes corresponding to concepts that are relevant to the business analytics of the organization using predefined criteria (step 416). The computer searches the semantic graph based on the restricted search to identify those nodes corresponding to relevant central concepts within the semantic graph using graph centrality metrics (step 418).

The computer forms a subgraph of the semantic graph based on identification of the nodes corresponding to the relevant central concepts within the semantic graph using the graph centrality metrics (step 420). The computer identifies a plurality of paths in the subgraph using a bi-directional multiple hop search from the nodes corresponding to the relevant central concepts in the subgraph (step 422).

The computer, using a graph-theoretic metric and the graph centrality metrics, assign a relevance score to each path in the identified plurality of paths (step 424). The computer generates a set of declarative sentences using the relevant central concepts and concept relations corresponding to nodes in each respective path with an assigned relevance score greater than a minimum threshold score (step 426).

Further, the computer converts each declarative sentence in the set of declarative sentences into an interrogative sentence of a corresponding type that includes a word selected from a group consisting of who, what, when, where, and why to form the set of natural language questions (step 428). The computer outputs the set of natural language questions to the user to guide the user in the data analytics process (step 430). Thereafter, the process terminates.

Thus, illustrative embodiments of the present invention provide a computer-implemented method, computer system, and computer program product for dynamically generating relevant questions in natural language via semantic knowledge representation of a generic ontology of an organization to guide a user in starting a data analytics process. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for guided exploration of data using a computer and a client device via a semantic knowledge representation of a generic ontology, the computer-implemented method comprising:

generating, by the computer in a memory of the computer, a semantic graph corresponding to a dataset selected by a user using identified relations among columns of the dataset that are identified based on mapping the columns to main concepts in the generic ontology;

forming, by the computer, a subgraph of the semantic graph in the memory of the computer based on identification of nodes corresponding to relevant central concepts within the semantic graph using graph centrality metrics;

identifying, by the computer, a plurality of paths in the subgraph formed in the memory of the computer using a bi-directional multiple hop search from the nodes corresponding to the relevant central concepts in the subgraph formed in the memory of the computer;

assigning, by the computer, using a graph-theoretic metric and the graph centrality metrics, a relevance score to each path in the plurality of paths in the subgraph formed in the memory of the computer; and outputting, by the computer via a network, a set of natural language questions to the client device of the user based on relevant central concepts and concept relations corresponding to nodes in each respective path with an assigned relevance score greater than a minimum threshold score to the user to guide the user in a data analytics process, wherein the semantic graph is a directed graph that includes the nodes corresponding to the relevant central concepts in the subgraph formed in the memory of the computer and edges representing semantic relations between the relevant central concepts, and wherein the graph-theoretic metric is a path length of a particular path in the subgraph formed in the memory of the computer and the graph centrality metrics include a degree centrality of each concept node included in that particular path.

2. The computer-implemented method of claim 1 further comprising:

receiving, by the computer, an identification of the dataset selected by the user from the generic ontology that is comprised of a plurality of main concepts and concept relations relevant to business analytics of an organization.

3. The computer-implemented method of claim 2 further comprising:

ingesting, by the computer, the dataset selected by the user from the generic ontology;

identifying, by the computer, main concepts within the plurality of main concepts that are relevant to the dataset selected by the user in response to ingesting the dataset;

mapping, by the computer, columns of the dataset to the main concepts within the plurality of main concepts that are relevant to the dataset using a concept identification process; and identifying, by the computer, relations among the columns of the dataset based on the mapping of the columns to the main concepts.

4. The computer-implemented method of claim 1 further comprising:

restricting, by the computer, a search of the semantic graph to those nodes corresponding to concepts that are relevant to business analytics of an organization using predefined criteria; and searching, by the computer, the semantic graph based on the restricted search to identify those nodes corresponding to relevant central concepts within the semantic graph using the graph centrality metrics.

5. The computer-implemented method of claim 1 further comprising:

generating, by the computer, a set of declarative sentences using relevant central concepts and concept relations corresponding to nodes in each respective path with an assigned relevance score greater than the minimum threshold score.

6. The computer-implemented method of claim 5 further comprising:

converting, by the computer, each declarative sentence in the set of declarative sentences into an interrogative sentence of a corresponding type to form the set of natural language questions.

7. The computer-implemented method of claim 1, wherein the degree centrality is a sum of indegree and outdegree edges incident upon a given concept node.

8. The computer-implemented method of claim 7, wherein the computer utilizes a weighted average of the path length and cumulative degree centrality of nodes in the particular path to calculate the relevance score of that particular path in the subgraph formed in the memory of the computer.

9. The computer-implemented method of claim 1, wherein the computer updates the set of natural language questions in response to the user modifying the subgraph formed in the memory of the computer.

10. The computer-implemented method of claim 7 further comprising:

ranking each question of the set of natural language questions based on the relevance score for each of the particular path in the subgraph.

11. A network data processing system comprising a computer system coupled to a client device via a network, wherein the computer system is operable for guided exploration of data using the computer system and the client device via a semantic knowledge representation of a generic ontology, the computer system comprising:

a bus system;

a storage device connected to the bus system, wherein the storage device stores program instructions; and a processor connected to the bus system, wherein the processor executes the program instructions to:

generate a semantic graph corresponding to a dataset selected by a user in a memory of the computer system using identified relations among columns of the dataset that are identified based on mapping the columns to main concepts in the generic ontology;

form a subgraph of the semantic graph in the memory of the computer system based on identification of nodes corresponding to relevant central concepts within the semantic graph using graph centrality metrics;

identify a plurality of paths in the subgraph formed in the memory of the computer system using a bi-directional multiple hop search from the nodes corresponding to the relevant central concepts in the subgraph formed in the memory of the computer system;

assign, using a graph-theoretic metric and the graph centrality metrics, a relevance score to each path in the plurality of paths in the subgraph formed in the memory of the computer; and output a set of natural language questions to the client device of the user via the network based on relevant central concepts and concept relations corresponding to nodes in each respective path with an assigned relevance score greater than a minimum threshold score to the user to guide the user in a data analytics process, wherein the semantic graph is a directed graph that includes the nodes corresponding to the relevant central concepts in the subgraph formed in the memory of the computer and edges representing semantic relations between the relevant central concepts, and wherein the graph-theoretic metric is a path length of a particular path in the subgraph formed in the memory of the computer and the graph centrality metrics include a degree centrality of each concept node included in that particular path.

12. The computer system of claim 11, wherein the processor further executes the program instructions to:

receive an identification of the dataset selected by the user from the generic ontology that is comprised of a plurality of main concepts and concept relations relevant to business analytics of an organization.

13. The computer system of claim 12, wherein the processor further executes the program instructions to:

ingest the dataset selected by the user from the generic ontology;

identify main concepts within the plurality of main concepts that are relevant to the dataset selected by the user in response to ingesting the dataset;

map columns of the dataset to the main concepts within the plurality of main concepts that are relevant to the dataset using a concept identification process; and identify relations among the columns of the dataset based on the mapping of the columns to the main concepts.

14. The computer system of claim 11, wherein the processor further executes the program instructions to:

restrict a search of the semantic graph to those nodes corresponding to concepts that are relevant to business analytics of an organization using predefined criteria; and search the semantic graph based on the restricted search to identify those nodes corresponding to relevant central concepts within the semantic graph using the graph centrality metrics.

15. A computer program product for guided exploration of data using a computer and a client device via a semantic knowledge representation of a generic ontology, the computer program product comprising a computer readable storage medium having program instructions embodied therewith, the program instructions executable by the computer to cause the computer to perform a method comprising:

generating, by the computer in a memory of the computer, a semantic graph corresponding to a dataset selected by a user using identified relations among columns of the dataset that are identified based on mapping the columns to main concepts in the generic ontology;

forming, by the computer, a subgraph of the semantic graph in the memory of the computer based on identification of nodes corresponding to relevant central concepts within the semantic graph using graph centrality metrics;

identifying, by the computer, a plurality of paths in the subgraph formed in the memory of the computer using a bi-directional multiple hop search from the nodes corresponding to the relevant central concepts in the subgraph formed in the memory of the computer;

assigning, by the computer, using a graph-theoretic metric and the graph centrality metrics, a relevance score to each path in the plurality of paths in the subgraph formed in the memory of the computer; and outputting, by the computer via a network, a set of natural language questions to the client device of the user based on relevant central concepts and concept relations corresponding to nodes in each respective path with an assigned relevance score greater than a minimum threshold score to the user to guide the user in a data analytics process, wherein the semantic graph is a directed graph that includes the nodes corresponding to the relevant central concepts in the subgraph formed in the memory of the computer and edges representing semantic relations between the relevant central concepts, and wherein the graph-theoretic metric is a path length of a particular path in the subgraph formed in the memory of the computer and the graph centrality metrics include a degree centrality of each concept node included in that particular path.

16. The computer program product of claim 15 further comprising:

receiving, by the computer, an identification of the dataset selected by the user from the generic ontology that is comprised of a plurality of main concepts and concept relations relevant to business analytics of an organization.

17. The computer program product of claim 16 further comprising:

ingesting, by the computer, the dataset selected by the user from the generic ontology;

identifying, by the computer, main concepts within the plurality of main concepts that are relevant to the dataset selected by the user in response to ingesting the dataset;

mapping, by the computer, columns of the dataset to the main concepts within the plurality of main concepts that are relevant to the dataset using a concept identification process; and identifying, by the computer, relations among the columns of the dataset based on the mapping of the columns to the main concepts.

18. The computer program product of claim 15 further comprising:

restricting, by the computer, a search of the semantic graph to those nodes corresponding to concepts that are relevant to business analytics of an organization using predefined criteria; and searching, by the computer, the semantic graph based on the restricted search to identify those nodes corresponding to relevant central concepts within the semantic graph using the graph centrality metrics.

19. The computer program product of claim 15 further comprising:

generating, by the computer, a set of declarative sentences using relevant central concepts and concept relations corresponding to nodes in each respective path with an assigned relevance score greater than the minimum threshold score.

20. The computer program product of claim 19 further comprising:

converting, by the computer, each declarative sentence in the set of declarative sentences into an interrogative sentence of a corresponding type to form the set of natural language questions.

* * * * *